US010383138B2

(12) United States Patent
Huang et al.

(10) Patent No.: US 10,383,138 B2
(45) Date of Patent: Aug. 13, 2019

(54) SYSTEMS AND METHODS FOR CONCURRENT OPERATION OF DEVICES OVER DIFFERENT NETWORK TYPES

(71) Applicant: Intel IP Corporation, Santa Clara, CA (US)

(72) Inventors: Po-Kai Huang, Santa Clara, CA (US); Emily H. Qi, Camas, WA (US); Elad Oren, Tel Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 192 days.

(21) Appl. No.: 14/757,859

(22) Filed: Dec. 26, 2015

(65) Prior Publication Data

US 2017/0026995 A1 Jan. 26, 2017

Related U.S. Application Data

(60) Provisional application No. 62/195,132, filed on Jul. 21, 2015, provisional application No. 62/243,500, filed on Oct. 19, 2015.

(51) Int. Cl.

| *H04W 28/02* | (2009.01) |
| *H04W 48/16* | (2009.01) |
| *H04W 56/00* | (2009.01) |
| *H04W 72/12* | (2009.01) |
| *H04W 74/08* | (2009.01) |
| *H04W 84/12* | (2009.01) |

(Continued)

(52) U.S. Cl.
CPC ... *H04W 72/1278* (2013.01); *H04W 28/0247* (2013.01); *H04W 48/16* (2013.01);
(Continued)

(58) Field of Classification Search
CPC ....... H04L 45/20; H04L 67/104–1093; H04W 4/005–006; H04W 4/08; H04W 4/20; H04W 4/206; H04W 8/005; H04W 8/22–245; H04W 28/0247; H04W 28/10–14; H04W 40/02;
(Continued)

(56) References Cited

U.S. PATENT DOCUMENTS

| 9,338,659 B2 * | 5/2016 | Park ..................... H04W 16/14 370/348 |
| 2012/0170557 A1 | 7/2012 | Tsfati et al. |

(Continued)

FOREIGN PATENT DOCUMENTS

| EP | 2858433 | 4/2015 |
| WO | 2015-065014 | 5/2015 |

OTHER PUBLICATIONS

International Search Report and Written Opinion for PCT Application No. PCT/US2016/038831, dated Sep. 29, 2016, 12 pages.
(Continued)

*Primary Examiner* — Timothy J Weidner
(74) *Attorney, Agent, or Firm* — Eversheds Sutherland (US) LLP

(57) ABSTRACT

This disclosure describes methods, apparatuses, and systems related to signaling for concurrent operation and/or cancellation capabilities for termination of concurrent operations on networks (e.g., NAN, WLAN networks). In some implementations, systems and methods are provided for handling of time blocks that partially overlaps with the concurrent operations.

20 Claims, 13 Drawing Sheets

(51) Int. Cl.
*H04W 84/22* (2009.01)

(52) U.S. Cl.
CPC ... *H04W 56/0015* (2013.01); *H04W 72/1215* (2013.01); *H04W 72/1289* (2013.01); *H04W 74/085* (2013.01); *H04W 84/12* (2013.01); *H04W 84/22* (2013.01)

(58) Field of Classification Search
CPC ........... H04W 40/24–34; H04W 48/16; H04W 48/18; H04W 56/00–0025; H04W 72/00–14; H04W 74/002; H04W 74/08–0891; H04W 76/02; H04W 84/02; H04W 84/12; H04W 84/18–22; H04W 88/02; H04W 92/18
See application file for complete search history.

(56) References Cited

U.S. PATENT DOCUMENTS

| | | | |
|---|---|---|---|
| 2014/0219193 A1 | 8/2014 | Linde et al. | |
| 2016/0353470 A1* | 12/2016 | Liu | H04W 8/005 370/345 |
| 2017/0290029 A1* | 10/2017 | Park | H04W 72/12 370/338 |

OTHER PUBLICATIONS

Ericsson, "On Scheduling Assignments and Receiver Behaviour", R1-141391, 3GPP TSG-RAN WG1 Meeting #76bis, Shenzhen, China, Mar. 21, 2014, 6 pages.

* cited by examiner

| Field | Attribute ID 600 | Length 605 | Starting Time 610 | Duration 615 | Period 620 | Countdown 625 |
|---|---|---|---|---|---|---|
| Value | 602 Var | 607 Var | 612 Var | 617 Var | 622 Var | 627 Var |

FIG. 6

| Field | Channel Availability 700 | Operating Class 705 | Length 710 | Channel Number 715 | Countdown 720 |
|---|---|---|---|---|---|
| Value | 702 0/1 | 707 0/1 | 712 0/1 | 717 0/Var | 722 Var |

FIG. 7

| Field | Length 800 | Starting Time 805 | Duration 810 | Period 815 | Countdown 820 | Schedule ID 825 |
|---|---|---|---|---|---|---|
| Value | 802 Var | 807 Var | 812 Var | 817 Var | 822 Var | 827 Var |

FIG. 8

SYSTEMS AND METHODS FOR CONCURRENT OPERATION OF DEVICES OVER DIFFERENT NETWORK TYPES

CROSS-REFERENCE TO RELATED APPLICATIONS

This application claims the benefit of U.S. Provisional Application No. 62/195,132, filed Jul. 21, 2015 and U.S. Provisional Application No. 62/243,500, filed Oct. 19, 2015, which applications are hereby incorporated by reference herein in its entirety.

TECHNICAL FIELD

This disclosure generally relates to systems and methods for wireless communications and, more particularly, to concurrent operation of devices over different networks.

BACKGROUND

Avoiding data collisions is one of the roles of various media access (MAC) protocols. For example, carrier sense and exchange of request-to-send (RTS) and clear-to-send (CTS) packets have been used to prevent concurrent communication in wireless networks. Yet these approaches can prevent all concurrent communication, even exchanges that might not result in loss; they reduce end-to-end throughput in a multi-hop network; moreover, control traffic imposes control overhead on networks with small data payloads.

BRIEF DESCRIPTION OF THE DRAWINGS

The accompanying drawings form an integral part of the disclosure and are incorporated into the present specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

FIG. 6 illustrates a table showing various frame fields and values in accordance with one or more embodiments of the disclosure.

FIG. 7 illustrates another table showing various frame fields and values in accordance with one or more embodiments of the disclosure.

FIG. 8 illustrates a third table showing various frame fields and values in accordance with one or more embodiments of the disclosure.

DETAILED DESCRIPTION

Example embodiments described herein provide certain systems, methods, and devices, for providing signaling information to Wi-Fi devices in various Wi-Fi networks, including, but not limited to, IEEE 802.11ax (referred to as HE or HEW).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
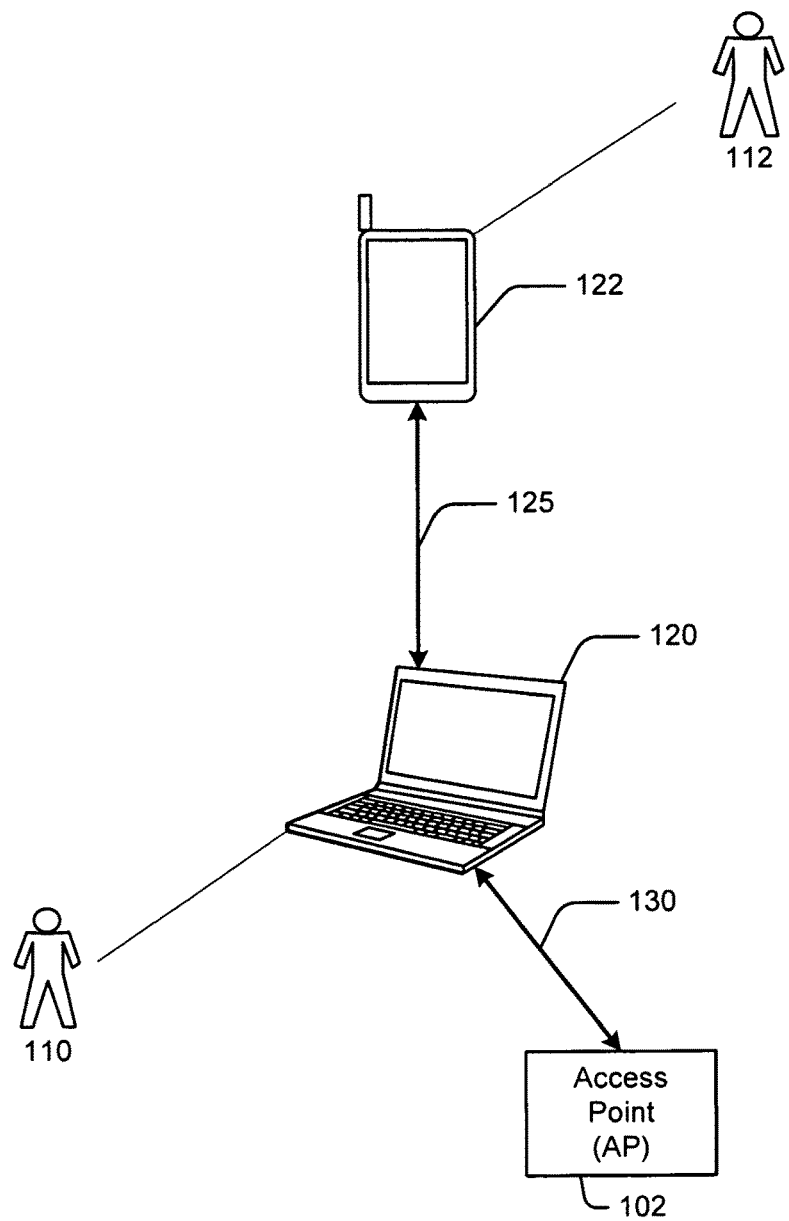
FIG. 1 depicts a network diagram illustrating an operational environment for wireless communication, according to one or more example embodiments of the disclosure.

FIG. 1 shows an example network environment of an illustrative wireless communication system in an exemplary embodiment of the disclosure. The network environment can include one or more user devices (for example, user device 120 and user device 122) and one or more access point(s) (AP) (e.g. AP 102), which may communicate in accordance with IEEE 802.11 communication standards, including, for example, IEEE 802.11ax. The user device(s) (e.g., user device 120 and user device 122) may be mobile devices, stations (STAs), and/or the like that are non-stationary and do not have fixed locations, and/or other types of computing devices. The one or more APs (e.g., AP 102) may be stationary and have fixed locations, or alternatively, they may be non-stationary devices. In some embodiments, the user devices (e.g., user device 120 and user device 122) and/or AP (e.g., AP 102 and AP 104) can include one or more computer systems similar to that of one or more of the exemplary devices of FIGS. 17, 18, and 19.

As shown in FIG. 1, multiple users (e.g., user 110 and user 112) can use devices (e.g., user device 120 and user device 122, respectively) configured for data transmission and reception over a first communication network to other devices 122 on the same first network. For example, a user device 120 configured to transmit and receive data over a Neighborhood Area Network (NAN) data link 125 to a second NAN user device 122 in a NAN network. Additionally, it may be desirable for one or more of the devices to, at substantially the same time (e.g., concurrently), be configured to also transmit and receive data over a second communication network to other devices on one or more second networks. In one exemplary aspect, a NAN user device 120 may transmit and receive data with AP 102 over a wireless network, (e.g., a WiFi network, a wireless local area network (WLAN), Personal area network (PAN), Local area network, (LAN), Metropolitan area network (MAN), a wide area network or (WAN), a WiFi direct network, a Bluetooth network, and the like), having data link (e.g. data link 130). In such situations, scheduling conflicts may arise for the NAN user device 120 between the device data exchange over the different types of networks, for example, the NAN network and the WiFi network.

To prevent the occurrence of such conflicts, the user device 120, communicating with the user device 122 over the NAN network may send scheduling information in one or more frames (alternatively referred to as attributes herein) in anticipation of future communication conflicts. In one aspect, an attribute can be a container that carries the scheduling information. In some embodiments, a frame can include information indicating the time blocks that the device will not be available, the duration of time that the device will not be available, and the like. Moreover, the scheduling information can specify channel information to indicate that one or more channels are or are not available. In one aspect, if no channel information is indicated, then all channels may be indicated as unavailable. Accordingly, the frame can inform the user device 122 of the period of concurrent operations so the user device 122 can avoid transmitting to the user device 120 during those periods. It can do so by, for example, canceling the data transmission, and/or to choosing a different channel to send the data on, among many other possible actions. For example, if the scheduling information indicates that the user device 120 is not available in a given channel(s) for a pre-determined duration, then the user device 122 may determine not to transmit frames in the channel(s) for the pre-determined duration. As another example, if the scheduling information indicates that user device 120 is not available in given channel(s) for a pre-determined duration, the user device 122 may determine not to transmit frames in the indicated channel(s) for the pre-determined duration. Alternatively, if the scheduling information indicates that the user device 120 is available in given channel(s) for a pre-determined duration, the user device 122 may only transmit frame in the channel(s) for the pre-determined duration.

In alternative embodiments, there may be more than two different communication networks, i.e., several networks, and one or more devices configured to use each of the several communication networks. Each device can send frames (e.g., broadcast, multicast, and/or unicast frames) to inform devices configured to exchange data using other network types to take action, for example, to wait for the next available non-conflicting period, to cancel the data transmission, and/or to choose a different channel to send the data on, among many other possible actions. In another aspect, the frame(s) can be sent at a pre-determined time between devices or can be sent at any given time, e.g. a time announced by the transmitting device. The devices may achieve this by sending multicast frames to multiple devices. In alternative embodiments, the devices may be configured to transmit and receive data over a one or more (up to and including all) of the different communication networks.

Figure 2:
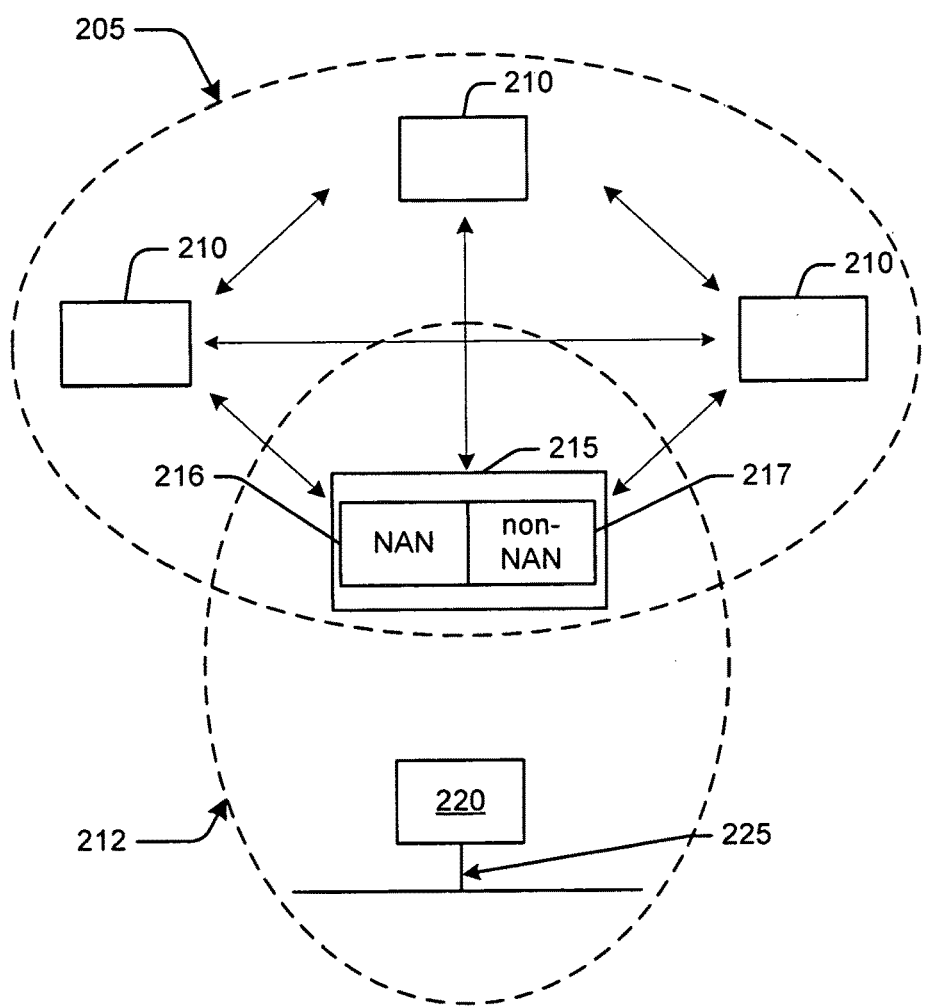
FIG. 2 depicts a network diagram illustrating a further operational environment for wireless communication, according to one or more example embodiments of the disclosure.

FIG. 2 shows a further embodiment of the example network environment of the wireless communication system in an exemplary embodiment of the disclosure. As shown in FIG. 2, one or more devices 210 (e.g., devices configured for transmit and receive data over a NAN data link) can be connected to another device in a first network (e.g., NAN) cluster 205, where the devices are synchronized to the same discovery window (DW) schedule, as will be elaborated on in the description for FIG. 3 below. Additionally, one or more devices 215 and 220 (e.g., devices configured to transmit and receive data over a WLAN data link) can be connected to one another in a second network 212. The second wireless network can be, for example, a WLAN, LAN, MAN, WAN, Bluetooth, and the like. In the illustrated embodiment, device 220 may be a WLAN access point (AP) that may be mobile or fixed, such as being mounted 225 to a structure. In an embodiment, the device 215 may be a hybrid device, that is, it may be configured to transmit and receive data over multiple network types, such as on a first NAN data link via a NAN module 216 and on a second WLAN link via a WLAN module 217. Thus, device 215 can transmit data to devices over either network (e.g., to the NAN cluster of devices 205 as well as the WLAN 212). In an aspect of the disclosure, the device 215 may utilize the NAN module 216 to send one or more frames in anticipation of future conflicts between NAN communications and WLAN communications, in order that the other NAN devices 210 wait for the next available non-conflicting period, or cancel the data transmission, or choose a different channel to send the data on, among many other choices. This can be done so that the different protocols (e.g., in the illustrated embodiment, NAN and WLAN) do not conflict with one another. While the illustrated embodiment of FIG. 2 is presented using the WLAN module 217, it will be appreciated that other wireless communication protocols supported by the device 215 also may have concurrent operations with the NAN module 216 that may result in conflicts that can be avoided according to the present disclosure, such as Bluetooth (or WLAN, LAN, MAN, WAN, and the like.)

Figure 3:
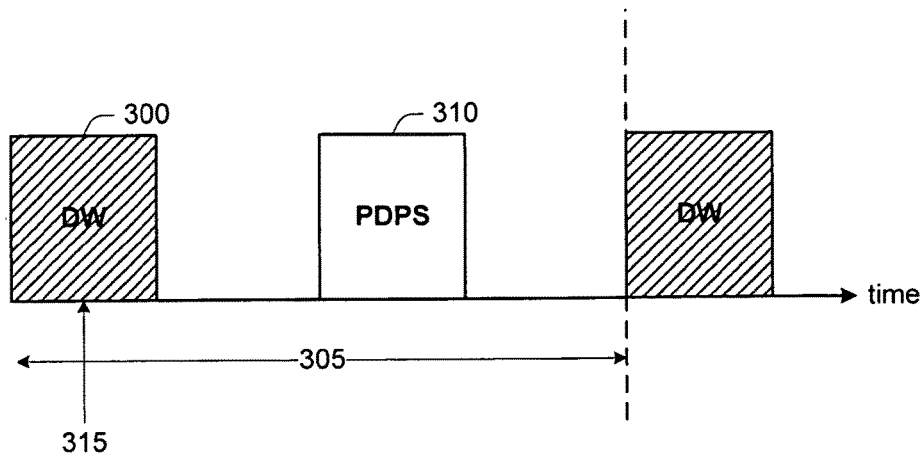
FIG. 3 illustrates an example timing diagram in accordance with one or more embodiments of the disclosure.

FIG. 3 shows an example timing diagram that represents the operation of an exemplary NAN device (e.g., user device 120 of FIG. 1 and/or user device 215 of FIG. 2) for data exchange over wireless networks, such as NAN, WLAN, LAN, MAN, WAN, and the like. The NAN device can thereby synchronize the time and channel on which it exchanges data with another NAN device, since the NAN devices can be synchronized to a common clock. Synchronization can have many advantages, such as decreasing the discovery latency, power consumption, and medium occupancy that would otherwise occur. In the timing diagram, there is a discover window (DW) 300, which can refer to the time and channel on which the devices converge. During the DW the devices are available with high probability for mutual discovery. During interim periods the devices may be asleep or involved with other activities, for example, communicating on other networks, possibly on a different channel. In addition, the timing diagram can feature a periodic data path schedule (PDPS) 310 where the data is actually transmitted between devices. All of this can occur in a first cycle 305, and the cycles can repeat periodically.

Here, potential conflict issues can be readily described. For example, for NAN operation, the DW can be signaled periodically, approximately every 512 time units (TU), where one TU is approximately 1024 micro seconds. However, if the device also supports WLAN operations, for example, it may transmit a beacon, for example, every 100 TU. Since 512 cannot be evenly divided by 100, the WLAN beacon transmission time will continually shift each 512 TU cycle. This can cause an overlap between the PDPS and the WLAN beacon transmission time of the device. This overlap can lead to the loss of the data path connection or the connection to another WLAN device. Of note, the WLAN beacon (or any other WLAN communication) may be one generated by the NAN device itself (e.g., a conflict between the communication protocols of a single device), and/or received from another WLAN device (e.g., a conflict between the NAN operations and concurrent operations with another WLAN device).

Thus, in one aspect, during the DW 300, the device (e.g., user device 120 of FIG. 1 and/or user device 210 of FIG. 2) can check for the existence of overlap operations with any PDPS's with other NAN devices and any other concurrent operations of other wireless protocols supported by the device. If such overlap operations are determined, the devices can send a frame 315 within the DW 300 to the other NAN devices on the data link during the DW 300.

Figure 4:
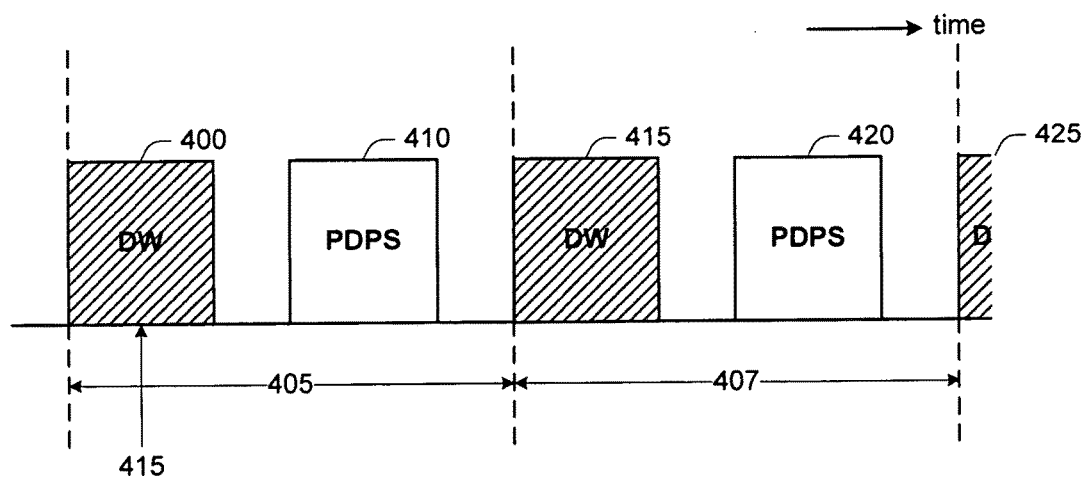
FIG. 4 illustrates another example timing diagram in accordance with one or more embodiments of the disclosure.

FIG. 4 shows the example timing diagram expanded for several cycles (e.g., cycle 405 and cycle 407). Again, the device (e.g., user device 120 FIG. 1 and/or user device 215 of FIG. 2) can try to determine conflicts due to concurrent operations between its NAN operations and its non-NAN wireless operations (e.g., WLAN, Bluetooth, LAN, MAN, WAN, and the like) during a DW 400. However, in this embodiment, the NAN device may determine that the conflict does not occur in the same cycle 405 but rather in a future cycle, e.g., cycle 407, or later. The NAN device can then send a frame 415 within the DW 400 in the first cycle 405 to specify a future conflict in, for example, the PDPS 420 or in future cycles (e.g., cycle 407, or later).

Figure 5A:
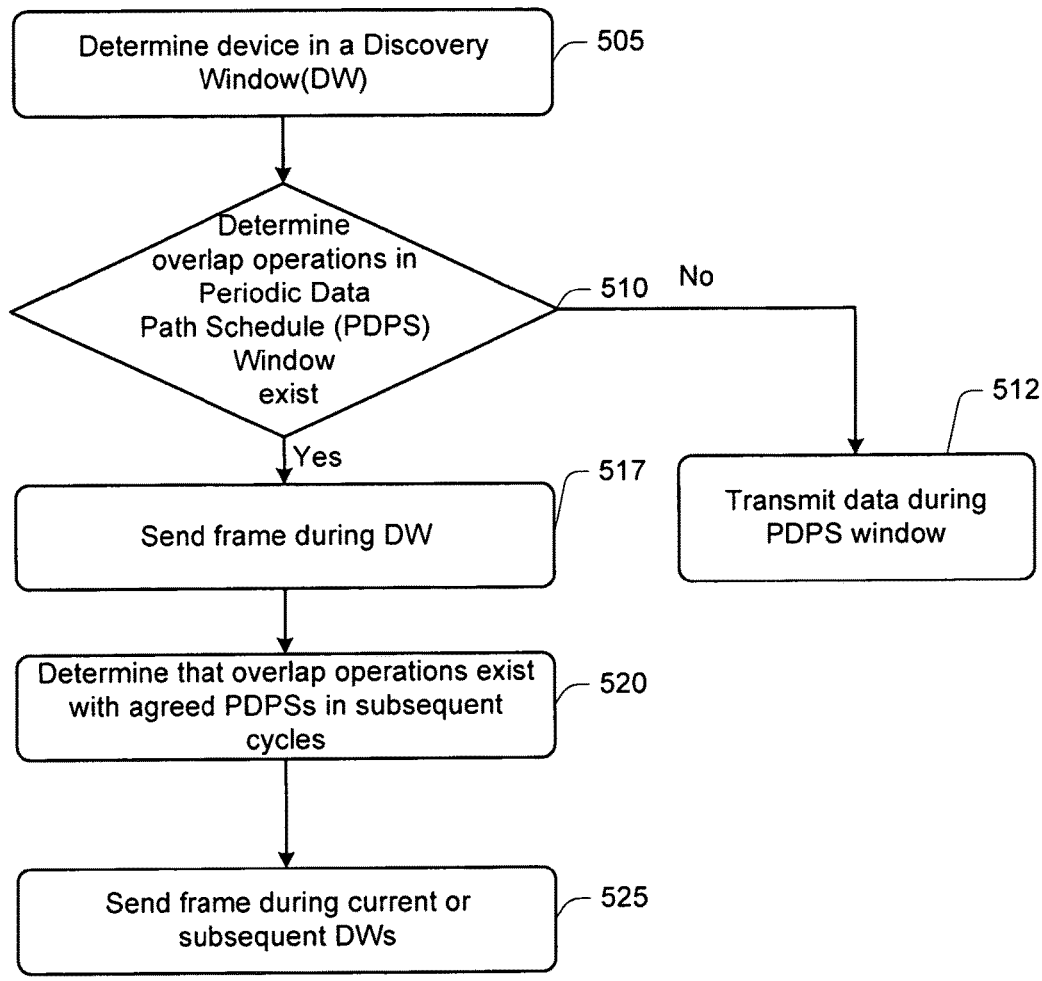
FIGS. 5A and 5B illustrate flow charts detailing example operations in accordance with one or more embodiments of the disclosure.

FIG. 5A is a general flowchart 500 illustrating aspects of the operation of a NAN device in accordance with the disclosure (e.g., user device 120 of FIG. 1 and/or user device 215 of FIG. 2). In one embodiment, the general operation of the NAN device having transceivers configured to communicate on a NAN network and a second network, such as WLAN, Bluetooth, LAN, MAN, WAN, and the like, includes determining schedule information associated with concurrent operations of the NAN network the second network; generating a frame, the frame including the schedule information; and sending the frame on NAN network. At block 505, the device may determine that it is in a DW (as shown, for example, in FIGS. 3 and 4, DW's 300 and 400). The determination can be made for example, by checking internal memory blocks associated with the device, and/or by monitoring network data associated with the device and/or communications on the network(s). Then, the device at block 510 determines whether there are overlap (e.g., concurrent) operations with any agreed PDPS's of other NAN devices (as shown, for example, in FIGS. 3 and 4, PDPS 310 and PDPS 410) with any non-NAN wireless operations, for example, a WLAN communication, such as a beacon transmission. The determination can be made for example, by checking internal memory blocks associated with the device, and/or by monitoring network data associated with the device and/or communications on the network(s). The overlap could be with the PDPS of the current cycle of that of a future cycle. If there are no overlap operations, then at block 512 the device can transmit the data transmission during the agreed PDPS(s). However, if there are overlap operations, then at block 517 the device can send a frame (for example, frame 315 in FIG. 3) to other NAN devices communicating over a data link during the DW. The device can, at block 520, also (simultaneously or in a future cycle) determine that there exists an overlap operation with any agreed PDPS's in future cycles (as shown for example in FIG. 4 PDPS 420 in cycle 407). If such overlap operations exist in future cycles, the device can, in 525, send a frame to other devices communicating over a data link during the DW of the same or future cycles (as shown for example in FIG. 4 element 415). From there, once the data schedules have been determined, the device can prepare for data transmission in the PDPS of whatever cycle (current or future) is determined to be available.

In some embodiments, the frame notifying the overlap may include a duration field. The device may determine the duration field for concurrent operation to inform other NAN devices of the duration that there will be overlap in the communication between the network(s) (e.g., the NAN and non-NAN networks). The frame may also include a notice of absence field. The device may determine the notice of absence field to signal the device's absence due to power save timing, concurrent operation, or off-channel scanning. The frame may also include a channel available field. The device may determine the channel available field to inform other participating devices that the device does not have a conflict in the current (or future) cycles.

Figure 5B:
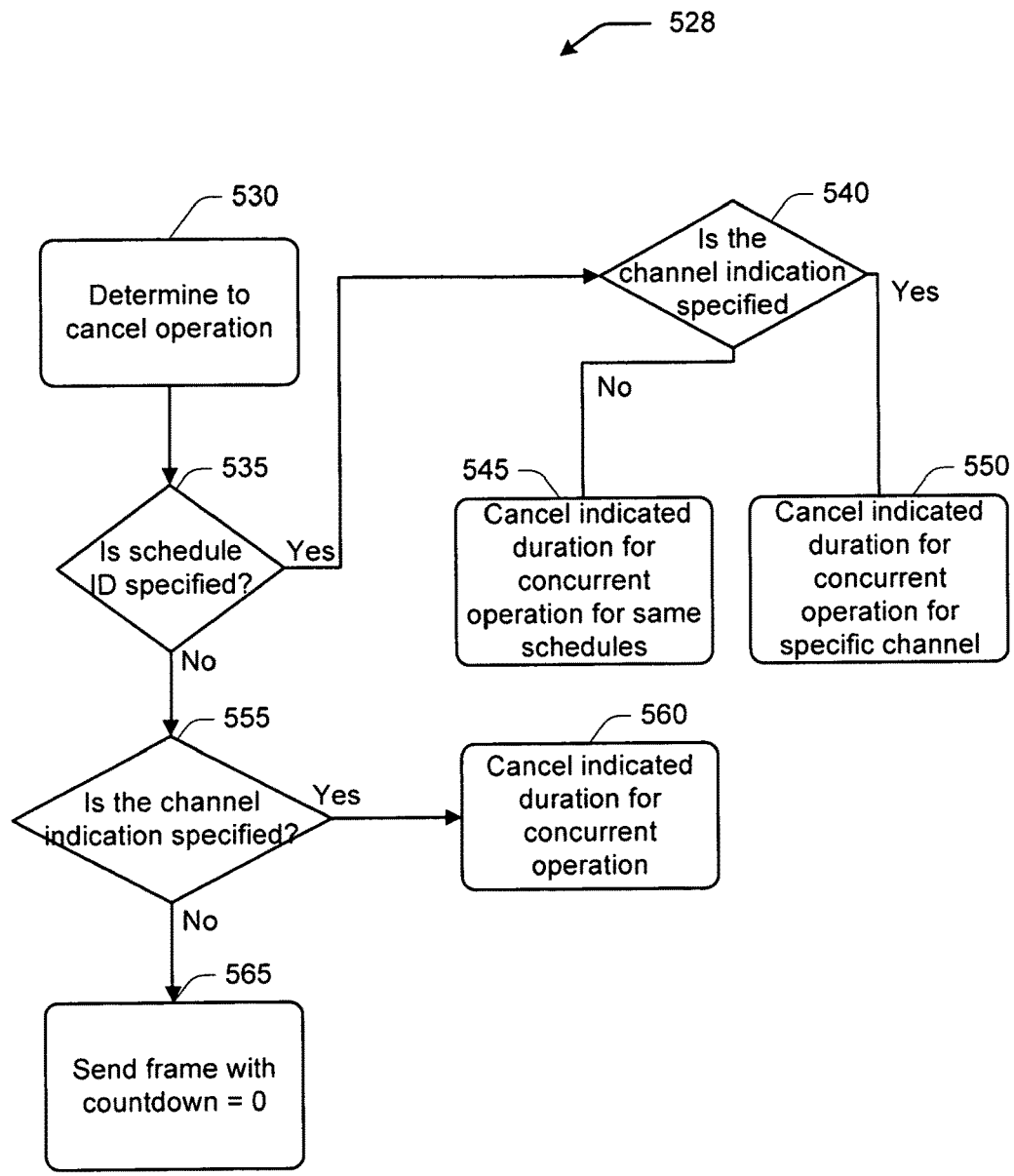

FIG. 5B is a general flowchart 528 illustrating aspects of the operation of a NAN device according to the disclosure. As shown the device (e.g., user device 120 of FIG. 1 and/or user device 215 of FIG. 2) may determine to cancel an operation (at block 530, for example as a part of, or in lieu of block 517 and/or block 525 of FIG. 5A). The operation can be, for example, a pre-scheduled data transmission or reception. Example reasons can include schedule conflict with existing data transmissions, anticipated down-time, and the like. The device can first determine if there exists a schedule ID field (at block 535). If yes, then the device can determine if there exists a channel indication field specified (at block 540). If the channel indication is specified, the device can cancel the indicated duration for concurrent operation for the specified channel previously sent by the transmitting device (at block 550). Alternatively, if the channel indication is not specified (at block 545), the device can cancel the indicated duration for concurrent operation for the same schedule ID previously sent by the transmitting device. This can then cancel the indicated duration field for the concurrent operation. If the schedule ID was not specified (at block 535), then the device can (at block 555) determine if there exists a channel indication field. The channel indication can refer to a field that can be added to enable more diverse concurrent operation among multiple devices operating over multiple channels. For example, the devices, alone or in combination with other devices, can have an optional list of channels that they can communicate through. For example, the different channels can occupy different frequencies. While a device may be unavailable in one channel, it may be available in a different channel. In this way, if the channel indication is specified, a given device can cancel (at block 560) the indicated duration for the concurrent operation for a given indicated channel. If, however, the channel indication is not specified, the device may transmit a frame element having a countdown field set to the value 0 (at block 565).

FIG. 6 shows a table of example frame elements that a NAN device in accordance with the disclosure (e.g., user device 120 of FIG. 1 and/or user device 215 of FIG. 2) can transmit or receive as a part of the frame communicated for example, during a DW (for example, DW 300 in FIG. 3 or DW 400 in FIG. 4). In one aspect, the data link(s) may already be established between the transmitting NAN device and the one or more receiving NAN devices. Alternatively the data link may be established (wholly or in part) by the transmission and/or reception of the frame and/or attributes. The attribute ID field 600 can have a variable value 602, which can identify the NAN attribute being sent. The length field 605 can have a variable value 607 that can specify the length of the following fields in the frame. The starting time field 610 can have a variable value 612 and can specify the starting time of the first indicated time blocks expressed in terms of the lower 4 bytes of the NAN time-synchronization function (TSF). The TSF can keep the timers of all participating devices synchronized. The duration field 615 can have a variable value 619 and can specify the duration for each indicated time block in units of microseconds. The period field 620 can have a variable value 622 and can specify the time between consecutive indicated time blocks in units of microseconds. The countdown field 625 can have a variable value 627 can specify the number of indicated time blocks for concurrent operation. For example, a countdown value of 2 can indicate that two time blocks will have concurrent operation. Moreover, a countdown value of 255 can indicate a continuous schedule.

FIG. 7 expands on the table of example frame elements of FIG. 6 that a device (e.g., user device 120 of FIG. 1 and/or user device 210 of FIG. 2) can transmit or receive as a part of the frame to communicate on one or more data links, for example, during a DW (for example, DW 300 in FIG. 3 or DW 400 in FIG. 4). In one aspect, the data link(s) may already be established between the transmitting device and the one or more receiving devices. Alternatively the data link may be established (wholly or in part) by the transmission and/or reception of the frames and/or attributes. The channel availability field 700 can be an optional field that can indicate the availability of the channel information. If the channel availability field has a value (702) of 1, it can specify that the device is available in the indicated channel. If it has a value (702) of 0 it can specify that the device is unavailable in the indicated channel. The operating class field 705 can be an optional field that takes a binary value (707) that can specify the frequency band that the device (e.g. the NAN devices) can be available. It can be defined as per the IEEE Std. 802.11-2012 Annex E Table E-5 Global Operating Classes standards. The length field 710 can be an optional field that takes a binary value (712) that can specify the length of the following channel indication field. This field may only be required if the channel list is used below. The channel number (and/or channel list and/or channel bitmap) field 715 can take a binary value (717) and can be an optional field which can specify the channel/channel list or channel bitmap for which the NAN device can be available or un-available. The countdown field 720 can takes a variable value (722) that can specify the number of indicated time blocks. The value (722) of 255 can specify a continuous schedule. A value (722) of 0 can indicate a cancelling operation.

FIG. 8 shows a table of example frame elements that a device (e.g. user device 120 of FIG. 1 and/or user device 210 of FIG. 2) can transmit or receive as a part of the frame to communicate on one or more data links, for example, during a DW (for example, DW 300 in FIG. 3 or DW 400 in FIG. 4). In one aspect, the data link(s) may already be established between the transmitting device and the one or more receiving devices. Alternatively the data link may be established (wholly or in part) by the transmission/reception of the frames and/or attributes. The length field 800 can have a variable value 802 and can specify the length of the following fields in the attribute. The starting time field 805 can have a variable value 807 and can specify the starting time for the first indicated time blocks expressed in terms of the lower 4 bytes of the NAN TSF. The duration field 810 can have a variable value 812 and can specify the duration for each indicated time block in units of microseconds. The period field 815 can have a variable value 817 and can specify the time between consecutive indicated time blocks in units of microseconds. The countdown field 820 can have a variable value 822 and can specify the number of indicated time blocks. A value of 255 can specify the continuous schedule. The schedule ID field 825 can have a variable value 827 and can specify the ID of the schedule.

Figure 9:
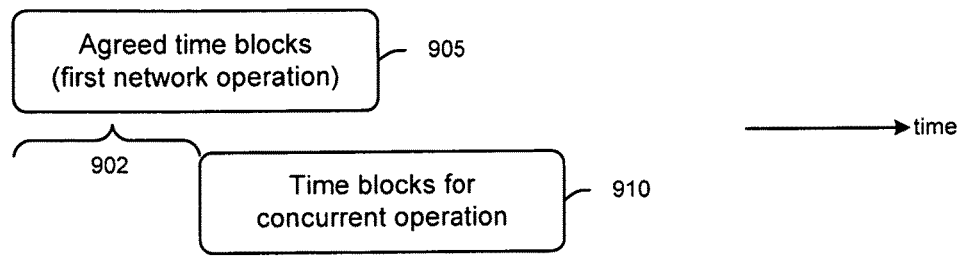
FIG. 9 shows an example of overlapping time blocks in accordance with one or more embodiments of the disclosure.

FIG. 9 illustrates an aspect of the PDPSs (for example, PDPS 310 of FIG. 3 or PDPS 410 of FIG. 4) whereby a device (e.g., user device 120 of FIG. 1 and/or user device 215 of FIG. 2) can use to determine overlap operations. A first time block 905 can refer to the agreed time block for NAN operation, and the second time block 910 can refer to the time blocks specified by the attribute for concurrent operation, for example, a time at which the device is schedule for operations on a second network, such as WLAN, Bluetooth, LAN, MAN, WAN, and the like. In this case, the first time block 905 can precede the second time block 910. Therefore, a remaining portion 902 of the first time block 905 can occur before the start of the second time block 910. The remaining portion 902 can be used in various operations, to be discussed in FIGS. 14-16.

Figure 10:
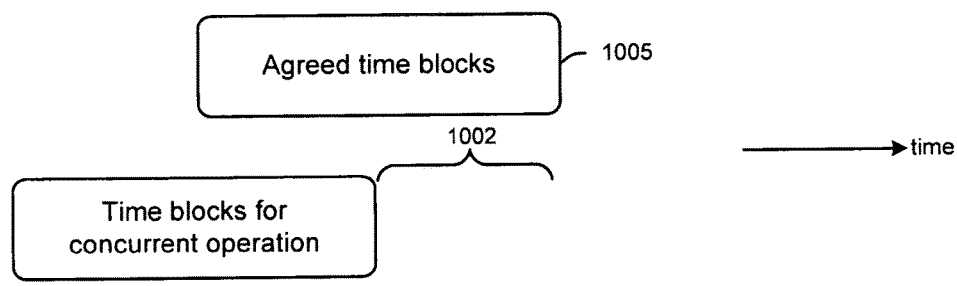
FIG. 10 shows another example of overlapping time blocks in accordance with one or more embodiments of the disclosure.

FIG. 10 illustrates another aspect of the PSDS (for example, PDPS 310 of FIG. 3 or PDPS 410 of FIG. 4), where the two time blocks can again overlap. However, in this case a second time block can precede the first time block 1005. Therefore, the remaining portion 1002 of the first time block 1005 can occur after the end of the second time block 1010.

Figure 11:
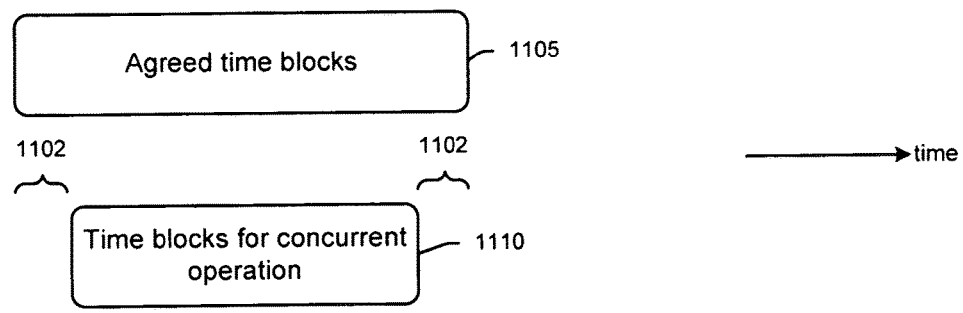
FIG. 11 shows a third example of overlapping time blocks in accordance with one or more embodiments of the disclosure.

FIG. 11 illustrates another aspect of the PDPS (for example, PDPS 310 of FIG. 3 or PDPS 410 of FIG. 4), whereby the second time block 1110 begins after the beginning of the first time block 1105 and ends before the end of the first time block 1105. Therefore, a remaining portion 1102 of the first time block 1105 can occur before the start of the second time block 1110, and another remaining portion 1102 of the first time block 1105 can occur after the end of the second time block 1110.

Figure 12:
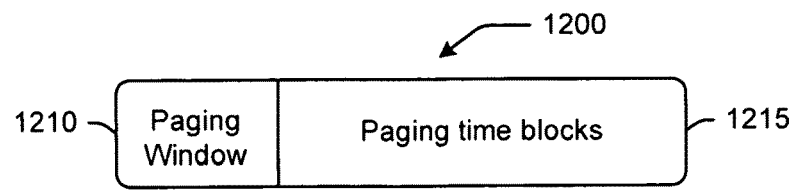
FIG. 12 shows an example of a paging time block in accordance with one or more embodiments of this disclosure.

FIG. 12 illustrates features of an example time block 1200. The time block 1200 (either for NAN operation or for concurrent operation) can be broken up into a paging time block 1215 and a paging window 1210. The paging window 1210 can occur at the start of the time block 1200 and precede the paging time block 1215. The paging window 1210 can serve to notify one or more devices of data transmission during the paging time block 1215. Thus, the device can determine whether or not to turn off its power in anticipation of data reception during the paging time blocks 1215.

Figure 13:
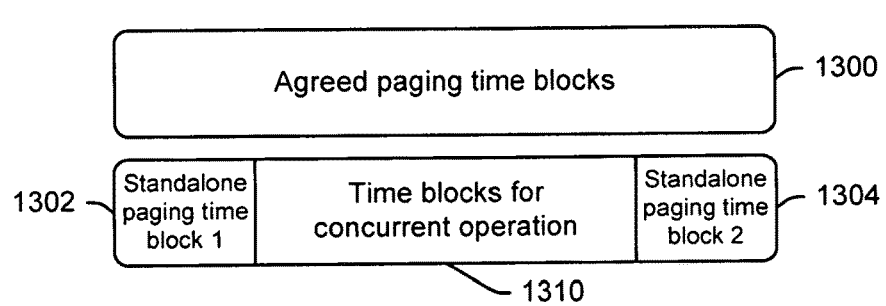
FIG. 13 shows a further example of paging time blocks in accordance with one or more embodiments of this disclosure.

FIG. 13 provides an illustration of a situation where the second time block 1304 begins after the beginning of the agreed paging time block 1300 and ends before the end of the agreed paging time block 1300, similar to the embodiment discussed in connection to FIG. 11, though it may also apply to the embodiments discussed in connection with FIG. 9 and FIG. 10. FIG. 13 shows that for the agreed paging time block 1300 (for example, for an agreed time block for a NAN operation), there can be a first standalone paging time block 1302 preceding the time blocks indicated by the attribute for concurrent operation 1310, and a standalone paging time block 1304 following the time blocks indicated by the attribute for concurrent operation 1310.

Figure 14:
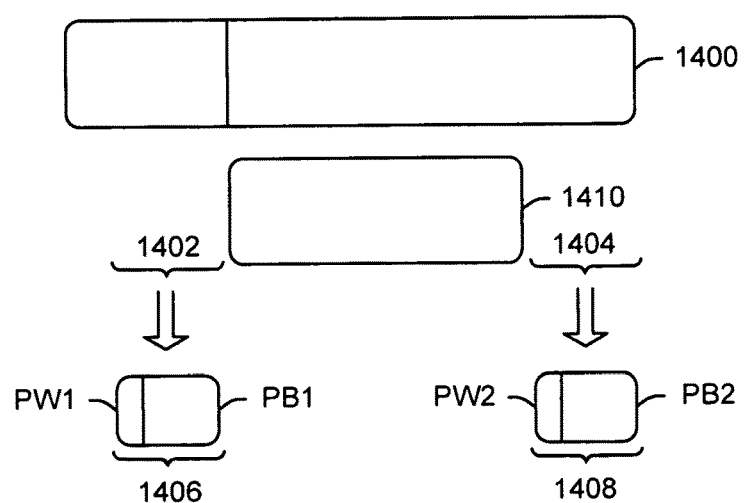
FIG. 14 shows yet a further example of paging time blocks in accordance with one or more embodiments of this disclosure.

FIG. 14 shows that for an agreed paging time block 1400 (for example, for an agreed time block for NAN operation), there can be a first standalone paging time block 1402 preceding the time blocks 1410 indicated by the attribute for concurrent operation, and a standalone paging time block 1404 following the time blocks 1410 indicated by the attribute for concurrent operation, as also generally illustrated in FIG. 13. In addition FIG. 14 shows the potential reclassification of the remaining time blocks to standalone time blocks (see the transition between 1402 and 1406, for example, and the transition between 1404 and 1408). It bears mentioning that this same mechanism of reclassification can apply to the remaining time blocks 902 of FIG. 9 and the remaining time block 1002 of FIG. 10 in the case where the partial overlap precedes or follows the time blocks for concurrent operation, respectively.

Figure 15:
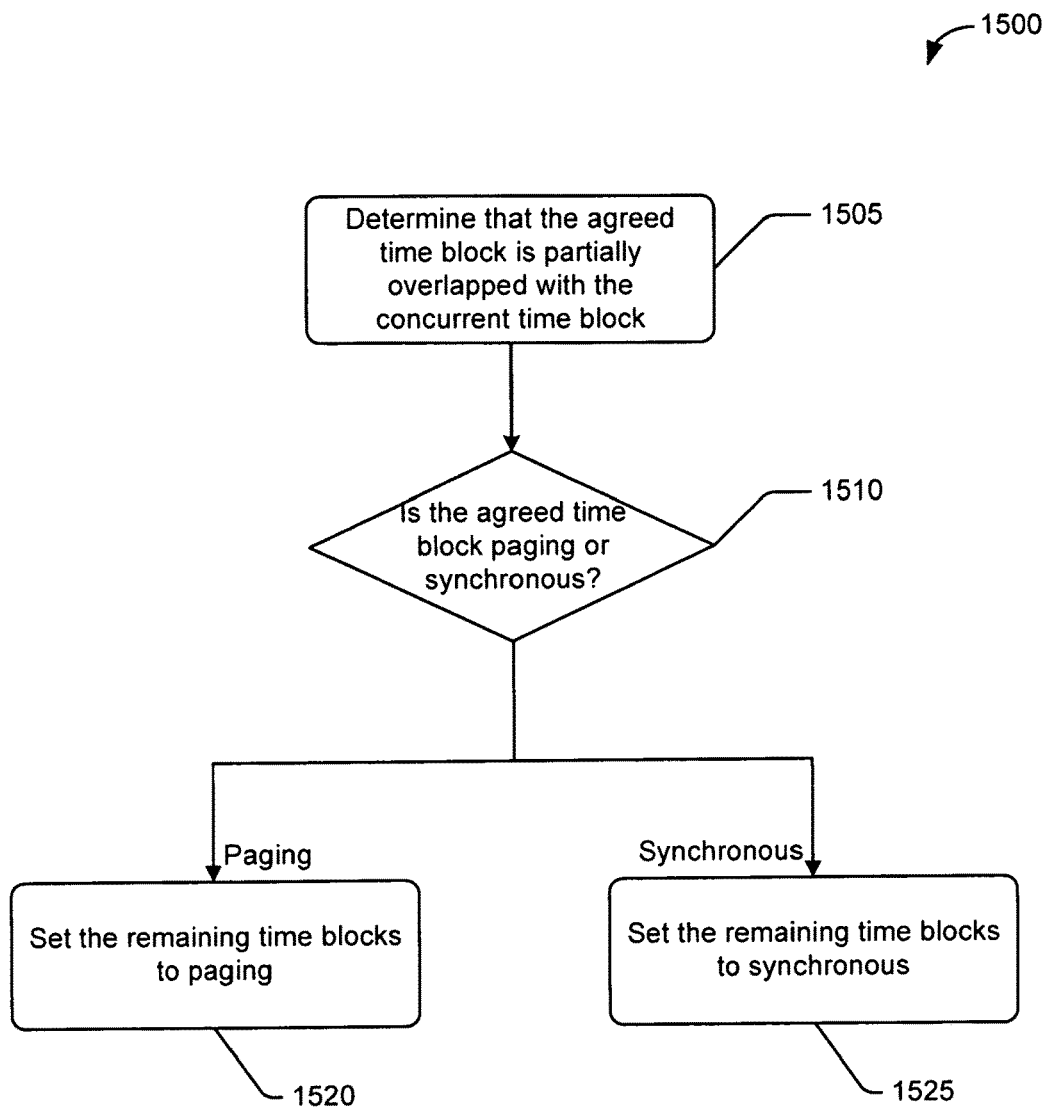
FIG. 15 illustrates a flow chart detailing example operations in accordance with one or more embodiments of the disclosure.

FIG. 15 shows a flowchart 1500 indicating the example operation of a device (e.g. user device 120 of FIG. 1 and/or user device 215 of FIG. 2) in one aspect of the disclosure. At block 1505 the device determines that the agreed time block (similar to, for example, time block 905 of FIG. 9, time block 1005 of FIG. 10, and time block 1105 of FIG. 11) is partially overlapping with the concurrent time block (similar to, for example, time block 910 of FIG. 9, time block 1010 of FIG. 10, and time block 1110 of FIG. 11). It can then determine whether the agreed time block is in a paging mode or a synchronization mode (at block 1510). If the agreed time block is in a paging mode then the remaining time block(s) (similar to, for example, remaining portion 902 of FIG. 9, remaining portion 1002 of FIG. 10, remaining portion 1102 of FIG. 11, remaining portions 1302 and 1304 of FIG. 13, and remaining portions 1406 and 1408 of FIG. 14) can be set to a paging mode (at block 1520). If the agreed time block is in a synchronization mode then the remaining time blocks can be set to a synchronization mode (at block 1525).

As used in this disclosure, a synchronization mode time block can refer to a mode of operation where the devices can transmit to one another at any time within the time block. On the other hand, a paging mode can refer to a mode of operation where the time block has a pre-determined portion of the time block functions as a paging window at the head of the time block. In this paging window, the devices can send short frames to one another to determine whether any devices intend to exchange data in the remainder of the paging time block. If the determination is that there will not be any communication, then the devices can enter a power savings state, for example, by sleeping, e.g., transitioning to reduced receptivity state using less power.

Figure 16:
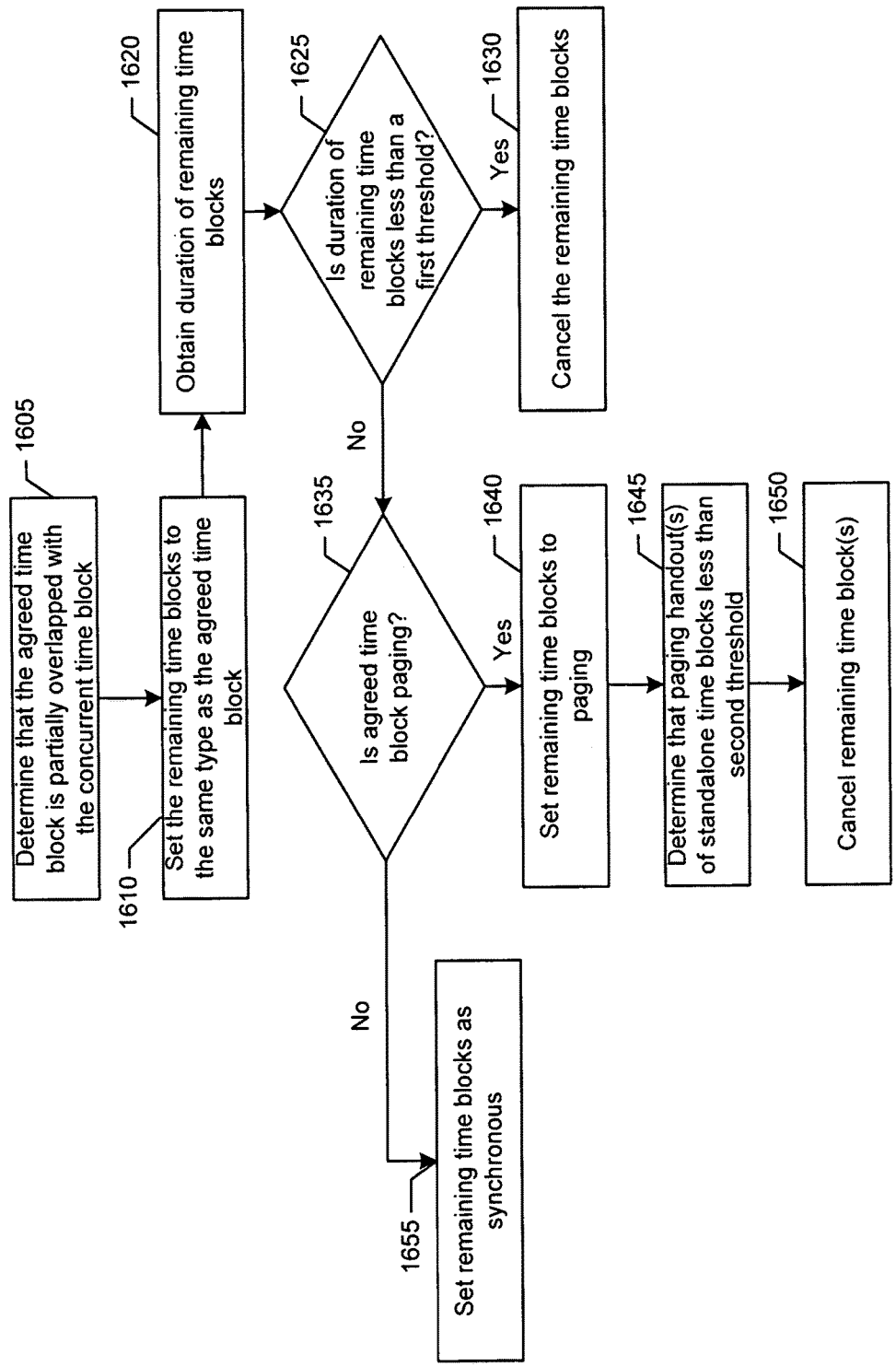
FIG. 16 illustrates another flow chart detailing example operations in accordance with one or more embodiments of the disclosure.

FIG. 16 shows a flowchart indicating device operation in one aspect of the disclosure. In 1605 the device (e.g. user device 120 of FIG. 1 and/or user device 215 of FIG. 2) determines that the agreed time block (similar to, for example, time block 905 of FIG. 9, time block 1005 of FIG. 10, and time block 1105 of FIG. 11) is partially overlapped with the concurrent time block (similar to, for example, time block 910 of FIG. 9, time block 1010 of FIG. 10, and time block 1110 of FIG. 11), yielding one or more remaining time blocks (similar to, for example, elements 902 of FIG. 9, elements 1002 of FIG. 10, and 1102 of FIGS. 11, 1302 and 1304 of FIG. 13, and 1406 and 1408 of FIG. 14). It can set the remaining time blocks (similar to, for example, remaining portion 902 of FIG. 9, remaining portion 1002 of FIG. 10, remaining portion 1102 of FIG. 11, remaining portions 1302 and 1304 of FIG. 13, and remaining portions 1406 and 1408 of FIG. 14) to the same type as the agreed time blocks (e.g. synchronous or paging) (at block 1610). Moreover, it can obtain the duration of the remaining time blocks (at block 1620). This duration can then be compared with a first threshold in 1625. For example, in some embodiments, the threshold can be approximately 16 ms. If the duration is less than the first threshold, then the remaining time blocks can be canceled (at block 1630). If the duration is greater than or equal to the first threshold, then the device can determine whether the agreed time block is paging or not (at block 1635). If the agreed time block is not paging, then the remaining time block(s) can be set to a synchronous operation (at block 1655). If, however, the agreed time block is paging, then the device can set the remaining time block(s) to paging (at block 1640). The device can then determine whether the paging window (similar to, for example, 1210 of FIG. 12) of the remaining time block(s) is less than a second threshold (at block 1645). For example, in some embodiments, the threshold can be approximately 16 ms. If the paging window of the remaining time blocks are less than this second threshold, then the remaining time blocks can be canceled (at block 1650).

In some aspects, one or more illustrative device(s) (e.g. user device 120 of FIG. 1 and/or user device 215 of FIG. 2) may be operable by one or more user(s) (e.g. user 110 and user 112 of FIG. 1). The device(s) (e.g. 120 of FIG. 1 and/or user device 215 of FIG. 2) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth.

Any of the device(s) (e.g. user device 120 of FIG. 1 and/or user device 215 of FIG. 2), and AP (e.g. AP 102 of FIG. 1 and AP 220 of FIG. 2) may be configured to communicate with each other via one or more communications networks and/or wirelessly or wired. Any of the communications networks and/or may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks may have any suitable communication range associated therewith and may include, for example, global networks (e.g., the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the device(s) (e.g. user device 120 of FIG. 1 or user device 215 of FIG. 2), and AP (e.g. AP 102 of FIG. 1 and AP 220 of FIG. 2) may include one or more communications antennae. Communications antenna may be any suitable type of antenna corresponding to the communications protocols used by the user device(s) (e.g. user device 120 of FIG. 1 or user device 215 of FIG. 2), and AP (e.g. AP 102 of FIG. 1 and AP 220 of FIG. 2). Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the devices.

Any of the device(s) (e.g. user device 120 of FIG. 1 or user device 215 of FIG. 2), and AP (e.g. AP 102 of FIG. 1 and AP 220 of FIG. 2) may include any suitable radio and/or transceiver for transmitting and/or receiving radio frequency (RF) signals in the bandwidth and/or channels corresponding to the communications protocols utilized by any of the device(s) (e.g. user device 120 of FIG. 1 or user device 215 of FIG. 2) and AP (e.g. AP 102 of FIG. 1 and AP 220 of FIG. 2) to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Figure 17:
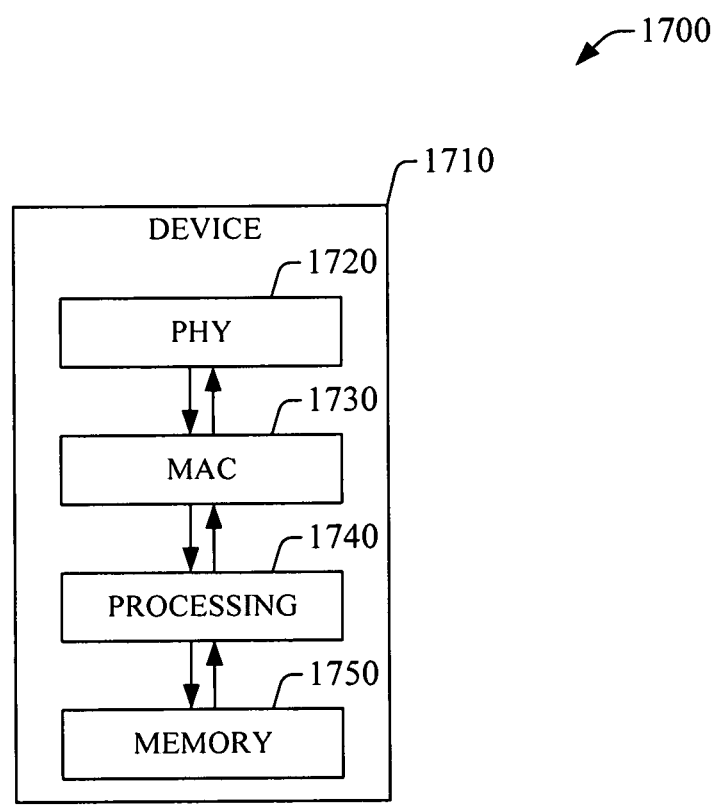
FIG. 17 illustrates a computational environment for the operations in accordance with one or more embodiments of the disclosure.

FIG. 17 presents another example embodiment 1700 of a device 1710 in accordance with one or more embodiments of the disclosure. The device 1710 can embody or can include, for example, one of the devices (e.g., user device 120 of FIG. 1 or user device 215 of FIG. 2) that implements or otherwise leverages the elements described herein in connection with signaling for concurrent operations for devices operating over different network types according to other types of network protocols. In certain embodiments, the communication device 1710 can be a HEW-compliant device that may be configured to communicate with one or more other HEW devices and/or other types of communication devices, such as legacy communication devices. HEW devices and legacy devices also may be referred to as HEW stations (HEW STAs) and legacy STAs, respectively. In one implementation, the communication device 1710 can operate as an access point (such as AP 102 of FIG. 1 and AP 210 of FIG. 2). As illustrated, the communication device 1710 can include, among other things, physical layer (PHY) circuitry 1720 and medium-access-control layer (MAC) circuitry 1730. In one aspect, the PHY circuitry 1720 and the MAC circuitry 1730 can be HEW compliant layers and also can be compliant with one or more legacy IEEE 802.11 standards. In one aspect, the MAC circuitry 1730 can be arranged to configure physical layer converge protocol (PLCP) protocol data units (PPDUs) and arranged to transmit and receive PPDUs, among other things. In addition or in other embodiments, the communication device 1710 also can include other hardware processing circuitry 1740 (e.g., one or more processors) and one or more memory devices 1750 configured to perform the various operations described herein.

In certain embodiments, the MAC circuitry 1730 can be arranged to contend for a wireless medium during a contention period to receive control of the medium for the HEW control period and configure an HEW PPDU. In addition or in other embodiments, the PHY circuitry 1720 can be arranged to transmit the HEW PPDU. The PHY circuitry 1720 can include circuitry for modulation/demodulation, upconversion/downconversion, filtering, amplification, etc. As such, the communication device 1710 can include a transceiver to transmit and receive data such as HEW PPDU. In certain embodiments, the hardware processing circuitry 1740 can include one or more processors. The hardware processing circuitry 1740 can be configured to perform functions based on instructions being stored in a memory device (e.g., RAM or ROM) or based on special purpose circuitry. In certain embodiments, the hardware processing circuitry 1740 can be configured to perform one or more of the functions described herein, such as allocating bandwidth or receiving allocations of bandwidth.

In certain embodiments, one or more antennas may be coupled to or included in the PHY circuitry 1720. The antenna(s) can transmit and receive wireless signals, including transmission of HEW packets or other type of radio packets. As described herein, the one or more antennas can include one or more directional or omnidirectional antennas, including dipole antennas, monopole antennas, patch antennas, loop antennas, microstrip antennas or other types of antennas suitable for transmission of RF signals. In scenarios in which MIMO communication is utilized, the antennas may be physically separated to leverage spatial diversity and the different channel characteristics that may result.

The memory 1750 can retain or otherwise store information for configuring the other circuitry to perform operations for configuring and transmitting HEW packets or other types of radio packets, and performing the various operations described herein including, for example, implementation (e.g., configuration, generation, and/or transmission) of signaling for concurrent operations for devices operating over different network types according to other types of network protocols, in accordance with one or more embodiments of this disclosure.

The communication device 1710 can be configured to communicate using OFDM communication signals over a multicarrier communication channel. More specifically, in certain embodiments, the communication device 1710 can be configured to communicate in accordance with one or more specific radio technology protocols, such as the IEEE family of standards including IEEE 802.11; IEEE 802.11n; IEEE 802.1 lac; IEEE 802.1 lax; DensiFi; Wi-Fi Aware, including Wi-Fi NAN; and/or proposed specifications for WLANs. In one of such embodiments, the communication device 1710 can utilize or otherwise rely on symbols having a duration that is four times the symbol duration of IEEE 802.11n and/or IEEE 802.11 ac. It should be appreciated that the disclosure is not limited in this respect and, in certain embodiments, the communication device 1710 also can transmit and/or receive wireless communications in accordance with other protocols and/or standards.

The communication device 1710 can be embodied in or can constitute a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as IEEE 802.11 or IEEE 802.16, Wi-Fi Aware, or other types of communication device that may receive and/or transmit information wirelessly. The communication device 1710 can include, for example, one or more of a keyboard, a display, a non-volatile memory port, multiple antennas, a graphics processor, an application processor, speakers, and other mobile device elements. The display may be an LCD screen including a touch screen.

It should be appreciated that while the communication device 1710 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In certain embodiments, the functional elements may refer to one or more processes operating or otherwise executing on one or more processors. It should further be appreciated that portions of the communication device 1710 can embody or can constitute an apparatus. For instance, the processing circuitry 1740 and the memory 1750 can embody or can constitute an apparatus that can operate in accordance with one or more aspects of this disclosure. The apparatus also can include functional elements (e.g., a bus architecture and/or API(s) as described herein) that can permit exchange of information between the processing circuitry 1740 and the memory 1750.

Figure 18:
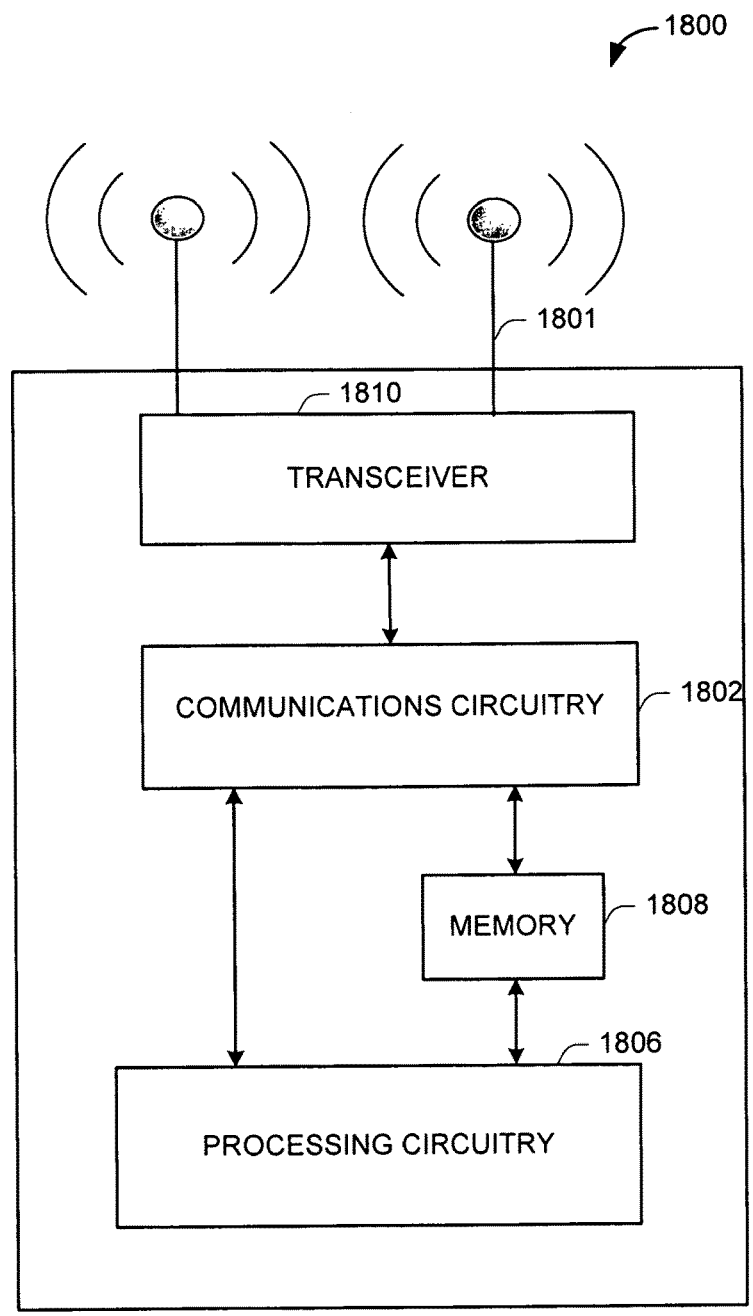
FIG. 18 illustrates a functional diagram of an example communication station that may be suitable for use as a user device, in accordance with one or more example embodiments of the disclosure.

FIG. 18 shows a functional diagram of an exemplary communication station 1800 in accordance with some embodiments. In one embodiment, FIG. 18 illustrates a functional block diagram of a communication station that may be suitable for use as an AP (e.g., AP 102 of FIG. 1 and 220 of FIG. 2) or communication station user device (e.g., user device 120 of FIG. 1 or 215 of FIG. 2) in accordance with some embodiments. The communication station 1800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 1800 may include communications circuitry 1802 and a transceiver 1810 for transmitting and receiving signals to and from other communication stations using one or more antennas 1801. The communications circuitry 1802 may include circuitry that can operate the physical layer communications and/or medium access control (MAC) communications for controlling access to the wireless medium, and/or any other communications layers for transmitting and receiving signals. The communication station 1800 may also include processing circuitry 1806 and memory 1808 arranged to perform the operations described herein. In some embodiments, the communications circuitry 1802 and the processing circuitry 1806 may be configured to perform operations detailed in FIGS. 3-16.

In accordance with some embodiments, the communications circuitry 1802 may be arranged to contend for a wireless medium and configure frames or packets for communicating over the wireless medium. The communications circuitry 1802 may be arranged to transmit and receive signals. The communications circuitry 1802 may also include circuitry for modulation/demodulation, upconversion/downconversion, filtering, amplification, etc. In some embodiments, the processing circuitry 1806 of the communication station 1800 may include one or more processors. In other embodiments, two or more antennas 1801 may be coupled to the communications circuitry 1802 arranged for sending and receiving signals. The memory 1808 may store information for configuring the processing circuitry 1806 to perform operations for configuring and transmitting message frames and performing the various operations described herein. The memory 1808 may include any type of memory, including non-transitory memory, for storing information in a form readable by a machine (e.g., a computer). For example, the memory 1808 may include a computer-readable storage device may, read-only memory (ROM), random-access memory (RAM), magnetic disk storage media, optical storage media, flash-memory devices and other storage devices and media.

In some embodiments, the communication station 1800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1800 may include one or more antennas 1801. The antennas 1801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1800 may include one or more of a keyboard, a display, a non-volatile memory port, multiple antennas, a graphics processor, an application processor, speakers, and other mobile device elements. The display may be an LCD screen including a touch screen.

Although the communication station 1800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1800 may include one or more processors and may be configured with instructions stored on a computer-readable storage device memory.

Figure 19:
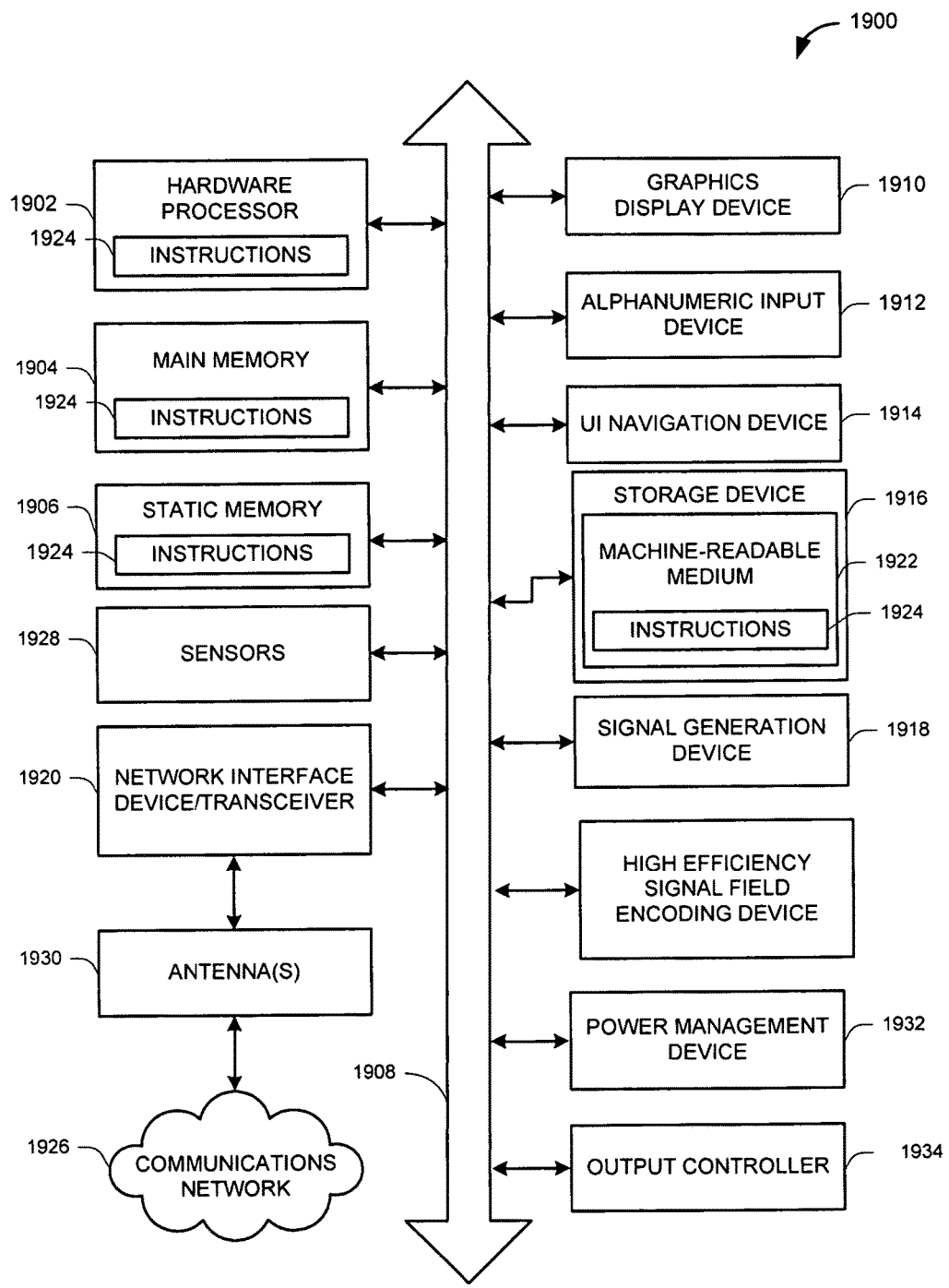
FIG. 19 is a block diagram of an example machine upon which any of one or more techniques (e.g., methods) may be performed, in accordance with one or more embodiments of the disclosure.

FIG. 19 illustrates a block diagram of an example of a machine 1 900 or system upon which any one or more of the techniques (e.g., methodologies) discussed herein may be performed. In other embodiments, the machine 1 900 may operate as a standalone device or may be connected (e.g., networked) to other machines. In a networked deployment, the machine 1900 may operate in the capacity of a server machine, a client machine, or both in server-client network environments. In an example, the machine 1900 may act as a peer machine in peer-to-peer (P2P) (or other distributed) network environments. The machine 1 900 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1900 may include a hardware processor 1902 (e.g., a central processing unit (CPU), a graphics processing unit (GPU), a hardware, processor core, or any combination thereof), a main memory 1904 and a static memory 1906, some or all of which may communicate with each other via an interlink (e.g., bus) 1908. The machine 1 900 may further include a power management device 1 932, a graphics display device 1910, an alphanumeric input device 1912 (e.g., a keyboard), and a user interface (UI) navigation device 1914 (e.g., a mouse). In an example, the graphics display device 1910, alphanumeric input device 1 912, and UI navigation device 1 914 may be a touch screen display. The machine 1900 may additionally include a storage device (i.e., drive unit) 1916, a signal generation device 1 918 (e.g., a speaker), a high efficiency signal field parallel coding device 1919, a network interface device/transceiver 1 920 coupled to antenna(s) 1 930, and one or more sensors 1 928, such as a global positioning system (GPS) sensor, compass, accelerometer, or other sensor. The machine 1900 may include an output controller 1934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 1 916 may include a machine readable medium 1 922 on which is stored one or more sets of data structures or instructions 1924 (e.g., software) embodying or utilized by any one or more of the techniques or functions described herein. The instructions 1924 may also reside, completely or at least partially, within the main memory 1904, within the static memory 1906, or within the hardware processor 1 902 during execution thereof by the machine 1900. In an example, one or any combination of the hardware processor 1 902, the main memory 1 904, the static memory 1 906, or the storage device 1916 may constitute machine-readable media.

The high efficiency signal field parallel coding device 1919 may be configured to determine a communication channel between the device and a first device. The high efficiency signal field parallel coding device 1919 may be configured to determine one or more subchannels of the communication channel. The high efficiency signal field parallel coding device 1919 may be configured to determine a first high efficiency signal field and a second high efficiency signal field included in a high efficiency frame to be sent on the communication channel. The high efficiency signal field parallel coding device 1919 may be configured to encode the second high efficiency signal field into one or more groups based at least in part on the one or more subchannels. It is understood that the above are only a subset of what the high efficiency signal field parallel coding device 1919 may be configured to perform and that other functions included throughout this disclosure may also be performed by the high efficiency signal field parallel coding device 1919.

While the machine-readable medium 1 922 is illustrated as a single medium, the term "machine-readable medium" may include a single medium or multiple media (e.g., a centralized or distributed database, and/or associated caches and servers) configured to store the one or more instructions 1924.

The term "machine-readable medium" may include any medium that is capable of storing, encoding, or carrying instructions for execution by the machine 1900 and that cause the machine 1 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1924 may further be transmitted or received over a communications network 1926 using a transmission medium via the network interface device/transceiver 1920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1920 may include one or more physical jacks (e.g., Ethernet, coaxial, or phone jacks) or one or more antennas to connect to the communications network 1926. In an example, the network interface device/transceiver 1920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

According to example embodiments of the disclosure, there may be a device. The device may include a least one memory that stores computer-executable instructions, and at least one processor configured to access the at least one memory, wherein the least one processor is configured to execute the computer-executable instructions to: determine schedule information associated with a first network; generate a frame, the frame comprising the schedule information; and cause to send, by the one or more transceivers, the frame on the second network.

Implementation may include one or more of the following features. The device may, by the one or more transceivers, cause to send the frame using a first data link between the device and a second device, which may comprise a Neighborhood Area Network (NAN), on a second network. The device may communicate with a third device, which may comprise a non-NAN device, using a second data link to the first network. The device may further: determine second schedule information for a first network, wherein the second schedule information comprises at least one overlap operation between the second device and the third device; generate a frame, the frame comprising the second schedule information; and cause to send the second frame to the second device. Scheduling information may comprise one or more of a duration field, a start time field, a channel operating class, a channel indication, a channel availability, or a period field. The frame may comprise a unicast frame, a multicast frame, or a broadcast frame. The device may comprise an antenna coupled to one of the one or more transceivers According to example embodiments of the disclosure, there may be a non-transitory computer-readable medium. The medium may include storing computer-executable instructions which, when executed by a processor, cause the processor to perform operations comprising: determining schedule information associated with a first network; generating a frame, the frame comprising the schedule information; and causing to send the frame on the second network.

Implementation may include one or more of the following features. The non-transitory computer-readable medium may perform operations causing to send the frame using a first data link between the device and a second device, which may comprise a Neighborhood Area Network (NAN), on a second network. The medium may perform operations causing it to communicate with a third device, which may comprise a non-NAN device, using a second data link to the first network. The medium may further perform operations: determining second schedule information for a first network, wherein the second schedule information comprises at least one overlap operation between the second device and the third device; generating a frame, the frame comprising the second schedule information; and causing to send the second frame to the second device. Scheduling information may comprise one or more of a duration field, a start time field, a channel operating class, a channel indication, a channel availability, or a period field. The frame may comprise a unicast frame, a multicast frame, or a broadcast frame.

According to example embodiments of the disclosure, there may be a device. The device may include a least one memory that stores computer-executable instructions, and at least one processor configured to access the at least one memory, wherein the least one processor is configured to execute the computer-executable instructions to: receive, from a second device on a first network, a frame; determine schedule information in the frame, the scheduling information including a duration when operations of the second device on a second network conflict with operations of the second device on the first network; and determine to take at least one action during the duration.

Implementation may include one or more of the following features. The at least one action of the device may transmit or not transmit one or more frames in the one or more pre-determined channels when the scheduling information indicates that the second device is available in the pre-determined channels. The device may comprise a NAN device. The scheduling information may comprise one or more of a channel operating class, a channel indication, or a channel availability.

According to example embodiments of the disclosure, there may be a method. The method may perform operations comprising: determining schedule information associated with a first network; generating a frame, the frame comprising the schedule information; and causing to send the frame on the second network.

Implementation may include one or more of the following features. The method may perform operations causing to send the frame using a first data link between the device and a second device, which may comprise a Neighborhood Area Network (NAN), on a second network. The method may perform operations causing it to communicate with a third device, which may comprise a non-NAN device, using a second data link to the first network. The method may further perform operations: determining second schedule information for a first network, wherein the second schedule information comprises at least one overlap operation between the second device and the third device; generating a frame, the frame comprising the second schedule information; and causing to send the second frame to the second device. Scheduling information may comprise one or more of a duration field, a start time field, a channel operating class, a channel indication, a channel availability, or a period field. The frame may comprise a unicast frame, a multicast frame, or a broadcast frame.

According to example embodiments of the disclosure, there may be an apparatus. The apparatus may perform operations comprising: means for determining schedule information associated with a first network; means for generating a frame, the frame comprising the schedule information; and means for causing to send the frame on the second network.

Implementation may include one or more of the following features. The apparatus may perform operations comprising means for causing to send the frame using a first data link between the device and a second device, which may comprise a Neighborhood Area Network (NAN), on a second network. The apparatus may perform operations comprising means for causing it to communicate with a third device, which may comprise a non-NAN device, using a second data link to the first network. The apparatus may further perform operations comprising: means for determining second schedule information for a first network, wherein the second schedule information comprises at least one overlap operation between the second device and the third device; means for generating a frame, the frame comprising the second schedule information; and means for causing to send the second frame to the second device. Scheduling information may comprise one or more of a duration field, a start time field, a channel operating class, a channel indication, a channel availability, or a period field. The frame may comprise a unicast frame, a multicast frame, or a broadcast frame.

According to example embodiments of the disclosure, there may be a non-transitory computer-readable medium. The medium may include storing computer-executable instructions which, when executed by a processor, cause the processor to perform operations comprising: receiving, from a second device on a first network, a frame; determining schedule information in the frame, the scheduling information including a duration when operations of the second device on a second network conflict with operations of the second device on the first network; and determining to take at least one action during the duration.

Implementation may include one or more of the following features. The at least one action of the non-transitory computer-readable medium may comprise transmitting or not transmitting one or more frames in the one or more pre-determined channels when the scheduling information indicates that the second device is available in the pre-determined channels. The medium may comprise a NAN device. The scheduling information may comprise one or more of a channel operating class, a channel indication, or a channel availability.

According to example embodiments of the disclosure, there may be a method. The method may perform operations comprising: receiving, from a second device on a first network, a frame; determining schedule information in the frame, the scheduling information including a duration when operations of the second device on a second network conflict with operations of the second device on the first network; and determining to take at least one action during the duration.

Implementation may include one or more of the following features. The at least one action of the method may comprise transmitting or not transmitting one or more frames in the one or more pre-determined channels when the scheduling information indicates that the second device is available in the pre-determined channels. The method may comprise a NAN device. The scheduling information may comprise one or more of a channel operating class, a channel indication, or a channel availability.

According to example embodiments of the disclosure, there may be an apparatus. The apparatus may perform operations comprising: means for receiving, from a second device on a first network, a frame; means for determining schedule information in the frame, the scheduling information including a duration when operations of the second device on a second network conflict with operations of the second device on the first network; and means for determining to take at least one action during the duration.

Implementation may include one or more of the following features. The at least one action of the apparatus may comprise means for transmitting or not transmitting one or more frames in the one or more pre-determined channels when the scheduling information indicates that the second device is available in the pre-determined channels. The apparatus may comprise a NAN device. The scheduling information may comprise one or more of a channel operating class, a channel indication, or a channel availability.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio, devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions; and
   at least one processor of one or more processors configured to access the at least one memory, wherein the at least one processor is configured to execute the computer-executable instructions to:
   determine schedule information associated with a first network, wherein the first network is a non-neighborhood area networking (NAN) network, and wherein the schedule information indicates one or more time blocks and one or more channels during which the device will not be available for transmissions;
   generate a frame, the frame comprising the schedule information; and
   cause to send the frame on a second network, wherein the second network is a neighbor awareness networking (NAN) network, and wherein the schedule information indicates to one or more NAN devices to avoid transmitting to the device during the one or more time blocks and the one or more channels.

2. The device of claim 1, wherein the device is a first device, and wherein the computer-executable instructions that cause to send the frame include computer-executable instructions to cause to send the frame using a first data link between the device and a second device on the second network.

3. The device of claim 2, wherein the second device comprises a NAN device.

4. The device of claim 3, wherein the at least one processor is further configured to execute the computer-executable instructions to cause to send data to a third device using a second data link on the first network, wherein the third device comprises a non-NAN device.

5. The device of claim 4, wherein the schedule information is a first schedule information and the frame is a first frame, and wherein the at least one processor is configured to further execute the computer-executable instructions to:
   determine second schedule information for the first network, wherein the second schedule information comprises at least one overlap operation between the second device and the third device;
   generate a second frame, the second frame comprising the second schedule information; and
   cause to send the second frame to the second device.

6. The device of claim 1, wherein the schedule information comprises one or more of a duration field and a start time field.

7. The device of claim 1, wherein the schedule information comprises one or more of a channel operating class, a channel indication, and a channel availability.

8. The device of claim 1, wherein the schedule information comprises a period field.

9. The device of claim 1, wherein the frame comprises a unicast frame, a multicast frame, or a broadcast frame.

10. The device of claim 1, further comprising one or more transceivers and an antenna coupled to one of the one or more transceivers.

11. A non-transitory computer-readable medium storing computer-executable instructions which, when executed by a processor, cause the processor to perform operations comprising:
    determining, by a device, schedule information associated with a first network, wherein the first network is a non-neighborhood area networking (NAN) network, and wherein the schedule information indicates one or more time blocks and one or more channels during which the device will not be available for transmissions;
    generating a frame, the frame comprising the schedule information; and
    causing to send the frame on a second network, wherein the second network is a neighbor awareness networking (NAN) network, and wherein the schedule information indicates to one or more NAN devices to avoid transmitting to the device during the one or more time blocks and the one or more channels.

12. The non-transitory computer-readable medium of claim 11, wherein the device is a first device and wherein the computer-executable instructions further cause the processor to perform operations comprising sending the frame using a first data link between the first device and a second device on the second network.

13. The non-transitory computer-readable medium of claim 12, wherein the second device comprises a NAN device.

14. The non-transitory computer-readable medium of claim 13, wherein the computer-executable instructions cause the processor to perform operations comprising communicating with a third device using a second data link on the first network, wherein the third device comprises a non-NAN device.

15. The non-transitory computer-readable medium of claim 14, wherein the schedule information is a first schedule information and the frame is a first frame, and wherein the computer-executable instructions further cause the processor to perform operations comprising:
    determining second schedule information for the first network, wherein the second schedule information comprises at least one overlap operation between the second device and the third device;
    generating a second frame, the second frame comprising the second schedule information; and
    causing to send the second frame to the second device.

16. A device, comprising:
    at least one memory that stores computer-executable instructions; and
    at least one processor of one or more processors configured to access the at least one memory, wherein the at least one processor is configured to execute the computer-executable instructions to:
    receive, from a second device on a first network of a first type, a frame, wherein the first type is a neighborhood area networking (NAN) network;

determine schedule information associated with a non-NAN network in the frame, wherein the schedule information indicates one or more time blocks and one or more channels during which the device will not be available for transmissions, and wherein the schedule information comprises an indication to avoid transmitting to the second device during the one or more time blocks and the one or more channels; and determine to take at least one action during the one or more time blocks and one or more channels.

17. The device of claim 16, wherein the computer-executable instructions that cause the at least one processor to determine to take the at least one action include computer-executable instructions that cause the at least one processor to determine not to transmit one or more frames in one or more pre-determined channels when the scheduling information indicates that the second device is not available in the pre-determined channels.

18. The device of claim 16, wherein the computer-executable instructions that cause the at least one processor to determine to take the at least one action include computer-executable instructions that cause the at least one processor to determine to transmit one or more second frames in one or more pre-determined channels when the scheduling information indicates that the second device is available in the pre-determined channels.

19. The device of claim 16, wherein the device comprises a non-NAN device.

20. The device of claim 16, wherein the schedule information comprises one or more of a channel operating class, a channel indication, and a channel availability.

* * * * *